(12) United States Patent
Schilder et al.

(10) Patent No.: US 12,032,704 B2
(45) Date of Patent: *Jul. 9, 2024

(54) SECURE CODE JUMP AND EXECUTION GATING

(71) Applicant: Google LLC, Mountain View, CA (US)

(72) Inventors: Marius P. Schilder, Sunnyvale, CA (US); Timothy Chen, Mountain View, CA (US); Scott D. Johnson, Cupertino, CA (US); Derek L Martin, Chandler, AZ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,698

(22) Filed: Aug. 31, 2021

(65) Prior Publication Data

US 2021/0397718 A1 Dec. 23, 2021

Related U.S. Application Data

(63) Continuation of application No. 15/898,858, filed on Feb. 19, 2018, now Pat. No. 11,157,627.

(Continued)

(51) Int. Cl.
*G06F 21/51* (2013.01)
*G06F 21/56* (2013.01)
(Continued)

(52) U.S. Cl.
CPC ............ *G06F 21/577* (2013.01); *G06F 21/51* (2013.01); *G06F 21/563* (2013.01);
(Continued)

(58) Field of Classification Search
CPC ...... G06F 21/577; G06F 21/51; G06F 21/567; G06F 21/575; G96F 21/563; H04L 9/0643
See application file for complete search history.

(56) References Cited

U.S. PATENT DOCUMENTS 7,398,554 B1 7/2008 Falik et al.
9,201,642 B2 12/2015 Fontenot et al.
(Continued)

FOREIGN PATENT DOCUMENTS

CN 1449515 10/2003
CN 101606164 12/2009
(Continued)

OTHER PUBLICATIONS

"Final Office Action", U.S. Appl. No. 15/898,858, filed May 20, 2020, 33 Pages.
(Continued)

*Primary Examiner* — Shin-Hon (Eric) Chen
*Assistant Examiner* — Vladimir I Gavrilenko
(74) *Attorney, Agent, or Firm* — Colby Nipper PLLC

(57) ABSTRACT

Systems, apparatuses, and methods for improving security of a silicon-based system by creating a glitch-resistant process for executing a software code block on the silicon-based system are disclosed. An example method may begin by marking the software code block as non-executable. Second, intent to execute the software code block is registered with a staging register. Third, the software code block is compressed into a compression constant. Fourth, the compression constant is compared with a first predetermined value using two comparators. Fifth, responsive to the comparators providing a true result after comparison, the software code block is marked as executable to allow the software code block to execute. In another aspect, the example method may be repeated for n>1 iterations, and in each iteration i, an ith software code block is compressed into an ith compression constant that is compared to an ith predetermined value.

20 Claims, 4 Drawing Sheets

Related U.S. Application Data

(60) Provisional application No. 62/466,660, filed on Mar. 3, 2017.

(51) Int. Cl.
  *G06F 21/57* (2013.01)
  *H04L 9/06* (2006.01)

(52) U.S. Cl.
  CPC .......... *G06F 21/567* (2013.01); *G06F 21/575* (2013.01); *H04L 9/0643* (2013.01)

(56) References Cited

U.S. PATENT DOCUMENTS

| | | | |
|---|---|---|---|
| 9,594,912 B1* | 3/2017 | Thioux | G06F 21/577 |
| 9,980,146 B2* | 5/2018 | Raleigh | H04L 41/046 |
| 11,157,627 B2 | 10/2021 | Schilder et al. | |
| 2008/0232582 A1* | 9/2008 | Chevallier-Mames | G06F 21/52 380/44 |
| 2010/0107246 A1 | 4/2010 | Ohta et al. | |
| 2010/0169750 A1 | 7/2010 | Chew et al. | |
| 2011/0063143 A1 | 3/2011 | Shiraishi | |
| 2012/0331303 A1 | 12/2012 | Andersson et al. | |
| 2014/0108786 A1 | 4/2014 | Kreft | |
| 2016/0012226 A1 | 1/2016 | Smith et al. | |
| 2016/0112064 A1* | 4/2016 | Dalton | G06F 3/0683 341/106 |
| 2017/0077964 A1* | 3/2017 | Guilford | H03M 13/6312 |
| 2018/0039538 A1* | 2/2018 | Freikorn | G06F 11/1048 |
| 2018/0157970 A1* | 6/2018 | Henry | G06F 12/08 |
| 2018/0247076 A1 | 8/2018 | Lerner et al. | |
| 2018/0253557 A1 | 9/2018 | Schilder et al. | |

FOREIGN PATENT DOCUMENTS

| | | |
|---|---|---|
| CN | 105260653 | 1/2016 |
| CN | 108537066 | 9/2018 |
| TW | 259985 | 8/2006 |
| WO | 2018160341 | 9/2018 |

OTHER PUBLICATIONS

"Foreign Office Action", CN Application No. 201810146500.4, Apr. 30, 2021, 24 pages.

"Foreign Office Action", Taiwanese Application No. 107105626, Oct. 16, 2018, 8 pages.

"Foreign Office Action", Taiwanese Application No. 107105626, Apr. 16, 2020, 12 pages.

"Foreign Office Action", Taiwanese Application No. 107105626, Apr. 23, 2019, 9 pages.

"Foreign Office Action", Taiwanese Application No. 107105626, Sep. 20, 2019, 11 pages.

"International Preliminary Report on Patentability", PCT Application No. PCT/US2018/017693, Sep. 12, 2019, 8 pages.

"International Search Report", PCT Application No. PCT/US2018/017693, Apr. 9, 2018, 4 pages.

"Non-Final Office Action", U.S. Appl. No. 15/898,858, filed Nov. 4, 2020, 30 pages.

"Non-Final Office Action", U.S. Appl. No. 15/898,858, filed Dec. 12, 2019, 31 Pages.

"Notice of Allowance", U.S. Appl. No. 15/898,858, filed Jul. 20, 2021, 11 pages.

"Written Opinion", PCT Application No. PCT/US2018/017693, 5 pages.

"Written Opinion", PCT Application No. PCT/US2018/017693, Apr. 9, 2018, 6 pages.

\* cited by examiner

SECURE CODE JUMP AND EXECUTION GATING

RELATED APPLICATION

This application is a continuation of, and claims priority to, U.S. Utility patent application Ser. No. 15/898,858, filed on Feb. 19, 2018, which, in turn, claims priority under 35 U.S.C. § 119(e) to U.S. Provisional Patent Application 62/466,660, filed on Mar. 3, 2017. All of which are incorporated herein by reference in their entireties.

BACKGROUND

Silicon chips are used in many silicon-based systems, such as mobile computers and smart phones. Each silicon chip can contain integrated circuitry and be used as a component of a computer or electronic system. Silicon chips are prone to malicious attacks, however, such as glitches caused by attackers with voltage, laser, or similar disruptive techniques. These glitches can affect program control flow, including causing jumps to a particular code location, possibly to an attacker's advantage.

In more detail, code-execution instructions of conventional silicon-based systems, such as JUMP instructions, may be executed in response to a conditional IF/THEN check instruction with a single condition that verifies the code. If the condition is met, the instruction returns TRUE and a code execution operation is performed. In the event that the instruction is a JUMP, the flow of execution is transferred by changing the instruction pointer register to a specified code space. If the condition is not met, the instruction returns FALSE and no code execution operation is performed.

This simple IF/THEN conditional operation is highly susceptible to attack because an IF check may be easily glitched from FALSE to TRUE or the JUMP operation may be glitched to jump to a location specified by an attacker to execute malicious code. An attacker may be able to fool the system into believing unverified or bad code is actually legitimate or, even if the code is legitimate, an attacker may be able to cause the system to jump to a bad location and execute undesirable code.

SUMMARY

Systems, apparatuses, and methods for improving security of a silicon-based system by creating a glitch-resistant process for executing a software code block are disclosed. An example method may begin by marking the software code block as non-executable. Second, intent to execute the software code block is registered with a staging register. Third, the software code block is compressed into a compression constant. Fourth, the compression constant is compared with a first predetermined value using two comparators. Fifth, responsive to the comparators providing a true result after comparison, the software code block is marked as executable to allow the software code block to execute. In another aspect, the example method may be repeated for n>1 iterations, and in each iteration i, an ith software code block is compressed into an ith compression constant that is compared to an ith predetermined value.

The details of one or more aspects are set forth in the accompanying drawings which are given by way of illustration only, and the description below. Other features, aspects, and advantages will become apparent from the description, the drawings, and the claims. Like reference numbers and designations in the various drawings indicate like elements.

DETAILED DESCRIPTION

To prevent attackers from being able to glitch an IF/THEN conditional check operation, a secure silicon-based system benefits from a glitch-resistant method to jump to verified code. A mechanism is needed to prevent glitching of an IF/THEN conditional check and to prevent a glitch from causing the system to jump to a bad location.

Even if a conditional statement, like an IF statement, is evaluated correctly, a JUMP statement can be glitched to cause the system to jump to a bad location. Further, a JUMP statement might not be contained within a conditional statement block, meaning it will be executed once execution reaches the point in the code where the JUMP statement occurs. It may be possible to glitch a JUMP statement that is not contained within a conditional statement block.

Therefore, in addition to preventing a glitch causing an incorrect evaluation of a conditional statement, it is desirable also to prevent execution of malicious code due to a glitch causing a jump to an incorrect location.

This document describes an improvement to the security of a silicon-based system by providing a glitch-resistant method for jumping to verified code and executing the code without having a single point of failure in a conditional check that verifies that certain code should be executed. Further, according to one or more aspects, the security of a silicon-based system can be improved by providing a glitch-resistant method for jumping to verified code and executing the code without having a single point of failure at the command that specifies a jump to a memory location.

An example aspect includes several separate parts to improve security of silicon-based systems. First, memories for storage on a silicon-based system may be able to hold executable code, and the executable code may have at least one execution attribute. Memories may include boot memory, read only memory, random access memory, electrically erasable programmable read-only memory (EEPROM), and flash, as further explained in reference to FIG. 3 below. Second, an example aspect may have staging registers that specify at least one execution attribute to logic that controls access to the memories according to the execution attributes. Third, there may be at least two comparators to determine whether executable code is verified and trusted.

Code execution may be separated into different execution levels, with each execution level relating to a separate software code block. Each execution level may have a different predetermined value. Code execution may not move to a different execution level without the predetermined value associated with the current execution level matching a compression constant obtained during the current execution level. An execution attribute for a software code block, memory containing a software code block, or memory that at a subsequent time may contain a software code block may include at least one of the following: executable, non-executable, or untrusted.

Figure 1:
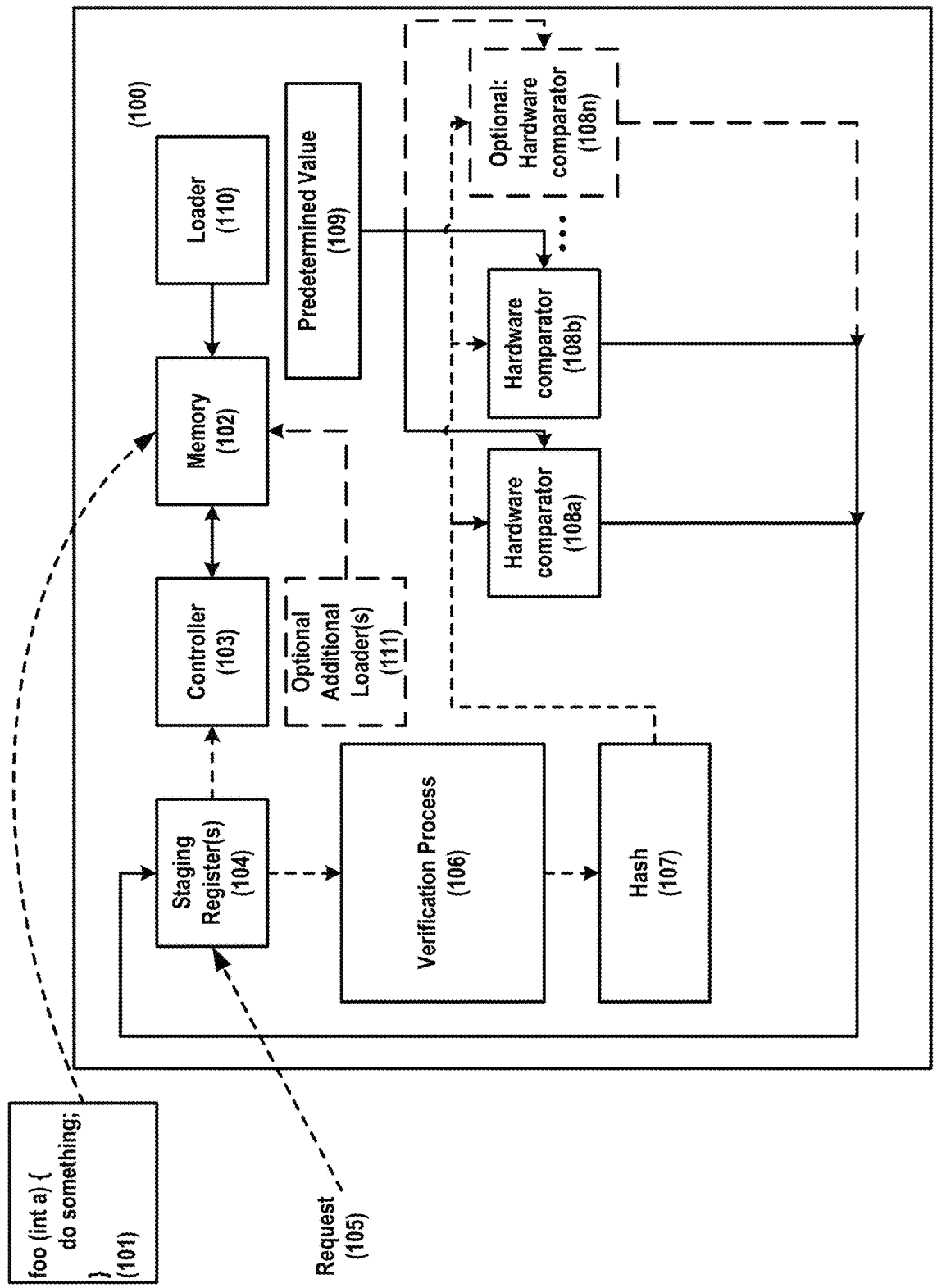
FIG. 1 illustrates a block diagram of functional elements of a silicon-based system that supports a glitch-resistant software code block execution process.

FIG. 1 illustrates a block diagram of functional elements of a silicon-based system (100) supporting a glitch-resistant software code block execution process. The silicon-based system may be in any number of forms, including a System-on-Chip (SoC) comprised of memory and/or logic integrated circuitry (IC) on a single silicon chip, a System-in-Package (SiP) or Multi-Chip package (MCP) comprised of multiple discrete silicon chips with dedicated functionalities, a computing device with multiple discrete components (each component with an encapsulated/packaged chip), or the like.

A software code block (101) may be received or downloaded to a memory (102) of the silicon-based system (100). A controller (103) may control whether the memory (102) can be read. The controller may be implemented in the form of at least one piece of hardware that surrounds the memory (102). In at least one embodiment, before executing the software code block (101), a loader (110), such as a boot loader, may mark the newly-downloaded software code block (101) as "non-executable," meaning if there are attempts to read code from the software code block (101), the silicon-based system (100) may be locked down and/or an error may be provided. The loader (110) may be in ROM, such as a boot ROM, which is hardwired on the silicon-based system (100). Once the loader (110) is verified and secured, optional additional loaders (111) may be loaded into the memory (102).

In at least one embodiment, marking the software code block (101) as non-executable may be done by at least one of marking the memory (102) containing the software code block (101) as non-executable. Similarly, marking the software code block (101) as executable may be done by at least one of marking the memory (102) containing the software code block (101) as executable.

Marking the software code block (101) either as executable or non-executable may be done by marking a starting memory address and an ending memory address, within the memory (102), in order to identify a location of the software code block (101) received or stored into the memory (102). Such marking may, in certain instances, occur prior to the memory (102) receiving or storing the software code block (101). Certain ranges of locations within the memory (102) may also be marked non-executable by default (and subsequently marked executable under conditions described herein).

When there is a request (105) from a requesting processor to execute the software code block (101), intent to execute the software code block (101) may be registered with a staging register (104). In at least one embodiment, registering intent may be done by storing, in the staging register (104), a load instruction with a memory location corresponding to the software code block (101). A controller (103) that controls the memory (102) containing the software code block (101) may determine whether the software code block (101) may be executed based on whether the software code block (101) is marked "executable" or "non-executable". The staging register (104) may then provide information to the requesting verification processor (106) that verifies the memory (102) containing the software code block (101) may take on at least one execution attribute as specified by the at least one staging register (104). For example, if the software code block (101) is found to be trusted and verified, the software code block (101) is marked as "executable." Execution of the requesting process, or execution of a thread in the requesting process, does not take place until receipt of notification that the software code block (101) is marked executable.

A verification processor (106) executes instructions that implement a verification process to verify that the software code block (101) is marked executable. As part of the verification process, the verification processor (106) identifies the software code block (101) to run as well as hash both metadata and the software code block (101) with a hash function. The software code block (101) may be contained inside a payload received from outside the silicon-based system (100). The payload may also contain the metadata, which may contain information indicating how the software code block (101) should be verified. The verification processor (106) may also use a combination of what the payload is and a bitfield indicating how the payload should be verified. If the payload and bitfield representation do not agree, the payload may not be verified by the verification processor (106).

Once the verification processor (106) has been successfully completed verification, the software code block (101) may be compressed to a compression constant via a compression processor (107) executing a hash algorithm A secure hash algorithm such as SHA2-256 or SHA3-256 may be used to create the compression constant. The compression constant may then be fed by software into two comparators (108a, 108b) for validation. The two comparators (108a, 108b) compare the compression constant with a predetermined value. The predetermined value is stored in the memory (102) of the silicon-based system (100) or in other hardware.

The embodiments are not limited to two comparators. Validation may employ three, four, or more optional comparators (108n). The results from the comparisons done by the comparators must agree (return true) when comparing the compression constant with the predetermined value in order to determine that the software code block (101) is not malicious.

The comparators (108a, 108b, . . . , 108n) may receive the same input and should return the same result indicating the compression constant is equal to the predetermined value. That is, each of the comparators (108a, 108b, . . . , 108n) may receive the same input and should return true, which indicates the compression constant is equal to the predetermined value. The returned results provided by the comparators (108a, 108b, . . . , 108n) must agree (return true) in order to determine that the tested software code block (101) is not malicious. Redundant comparator checks make the example system harder to attack since all comparator checks must match before marking the software code block (101) as "executable".

In an example embodiment, if the returned results provided by the comparators (108a, 108b, . . . , 108n) agree (return true) that the compression constant equals the predetermined value, the software code block (101) may be marked as "executable". In another example embodiment, if all of the returned results provided by the comparators (108a, 108b, . . . , 108n) agree (return true) that the compression constant equals the predetermined value, the software code block (101) may be moved to or stored in memory marked as "executable". In at least one embodiment, if the returned results provided by the comparators (108a, 108b, . . . , 108n) do not agree, the software code block may not be marked as "executable", and the controller (103) that controls the memory (102) may not allow the execution of the tested software code block (101). If at least one comparator returns false when determining whether the compression constant equals the predetermined value, then the software code block (101) may be marked as "non-executable" or moved to or stored in memory marked as "non-executable".

If all of the comparators (108a, 108b, . . . , 108n) do not agree, the software code block (101) may be marked as "untrusted". In at least one embodiment, if a software code block (101) is marked as "untrusted", the silicon-based system (100) may be locked down (e.g. further code execution may be forbidden and/or an error may be reported).

By combining the staging registers, the verification process, and the at least two comparators, a check of a conditional statement can be duplicated multiple times in hardware to create glitch resistance.

Software executed by the silicon-based system (100) may be partitioned into different execution levels. A software code block (e.g., software code block (101)) for a particular execution level must be compared to a predetermined value specific to the particular execution level. Execution levels may be determined by the software. As a the silicon-based system (100) boots up, the software may indicate which execution level the silicon-based system is running.

The software code block (101) may be locked until intent is registered with a staging register to execute the software code block. By marking the software code block as "executable" only after the comparators provide results indicating that the compression constant is equal to the predetermined value, the verification process ensures, barring a negligible probability, that an attacker cannot jump execution from the software code block (101) to anywhere in the silicon-based system (100). Only if the software code block (101) is marked "executable" may it be executed. After execution of the software code block (101), another software code block may then be downloaded and go through a next iteration of the process.

The software code block (101) may be invalidated after it has been accessed. In such instances, the software code block (101) is marked as non-executable and is invalidated via simple register writes. The software code block (101) may then be enabled again should it be desired that the software code block be executed again at a subsequent time.

Figure 2:
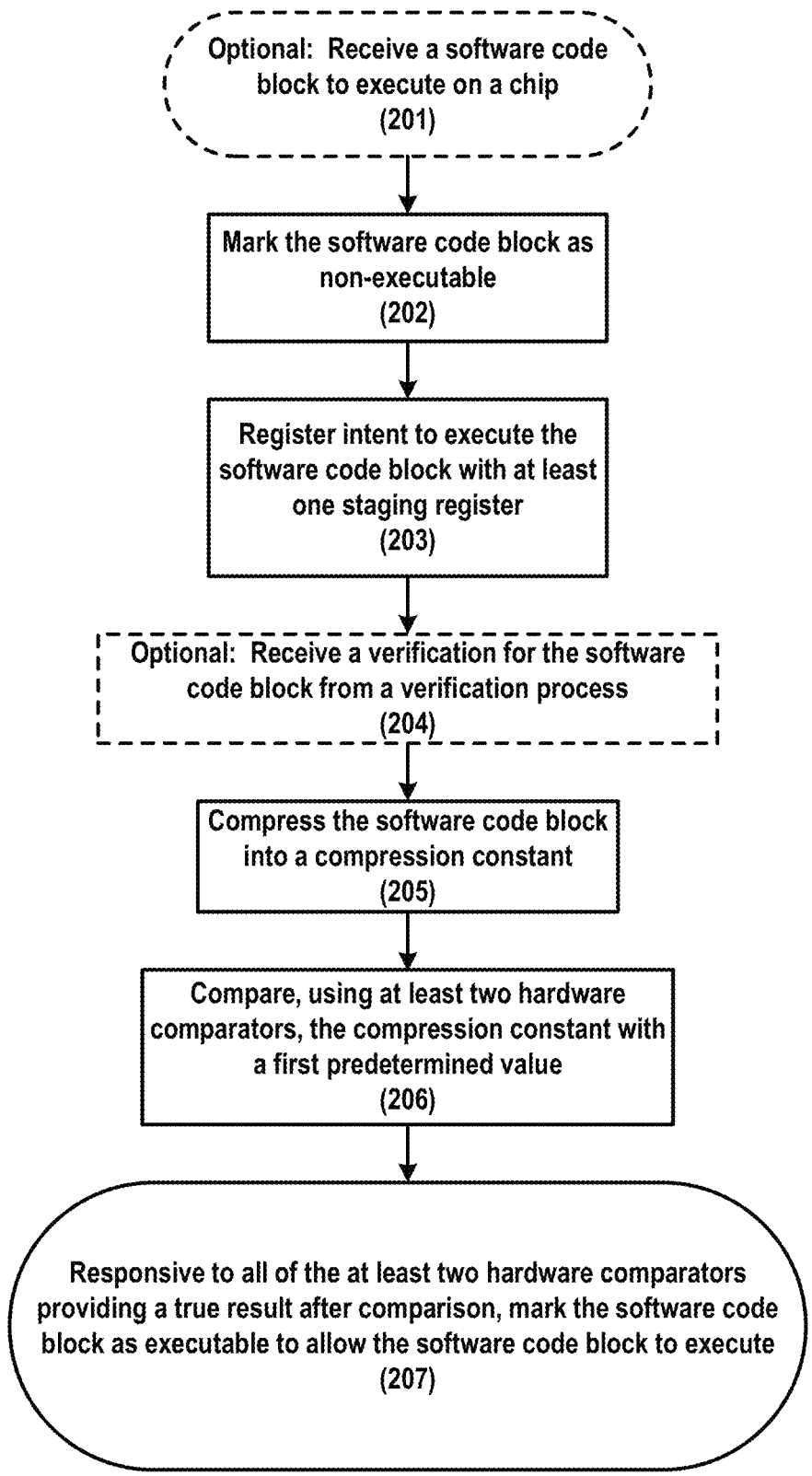
FIG. 2 is flow diagram of an example computer-implemented method for improving security of a silicon-based system by creating a glitch-resistant process for executing a software-code block by the silicon-based system.

FIG. 2 is flow diagram of an example computer-implemented method (200) for improving security of a silicon-based system by creating a glitch-resistant process for execution of a software-code block by the silicon-based system.

First, and optionally, at (201) software code block to execute on a silicon-based system is received. The silicon-based system may be the silicon-based system (100) of FIG. 1 and the software code block may be the software code block (101) of FIG. 1. Receiving the software code block (101) to execute on the silicon-based system (100) is optional if the software code block (101) has already been loaded or received.

Second, at (202) the software code block (101) is marked as non-executable. Third, at (203), the intent to execute the software code block (101) is registered with at least one staging register, such as the staging register (104) of FIG. 1.

Optionally, and fourth at (204), a verification process, which verifies the software code block (101), is executed.

The verification process may be executed by a verification processor, such as the verification processor (106) of FIG. 1.

Fifth, at (205), the software code block is compressed into a compression constant. The compression may be performed by a compression processor, such as the compression processor (107) of FIG. 1 executing a hash algorithm.

Sixth, at (206), the compression constant is compared with a first predetermined value using at least two comparators. The comparators can be, for example, the comparators (108a, 108b, . . . , 108n) of FIG. 1.

Seventh, at (207) and responsive to the comparators providing a true result after comparison, the software code block (101) is marked as executable to allow the software code block to execute.

Figure 3:
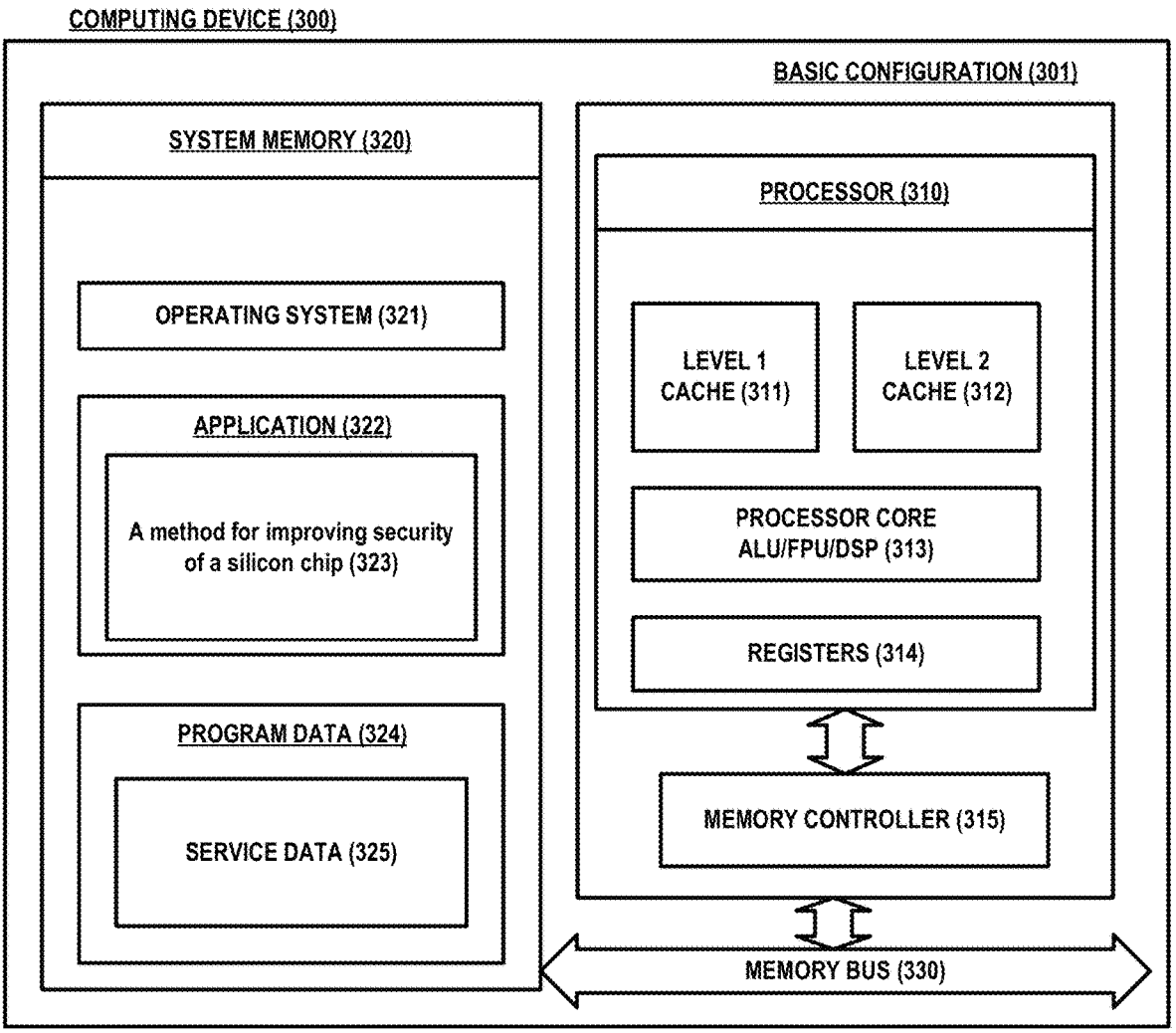
FIG. 3 is a flow diagram of an example computer-implemented method for improving security of a silicon-based system by creating a glitch-resistant process for executing n>1 software code blocks, wherein the ith software code block executes on an ith execution level, $i \in \{1, \ldots, n\}$.

FIG. 3 is an example flow diagram of a computer-implemented method (300) for improving security of a silicon-based system by creating a glitch-resistant process for executing n>1 software code blocks, wherein the ith software code block executes on an ith execution level, i∈{1, . . . , n}. The method may be performed by one or more combinations of the functional elements of the silicon-based system (100) depicted in FIG. 1.

First, at (301), a counter i is set to equal 1. The counter may be set and maintained by a verification processor, such as the verification processor (106) of FIG. 1, or other logic circuitry or hardware that may be present in the silicon based system.

Optionally, and second at (302), an ith software code block is received. The ith software code block may be the software code block (101) of FIG. 1 and may be received by a memory, such as the memory (102) of FIG. 1. Receiving an ith software code block is optional in that, for example, an ith software code block may already be loaded or received.

Third, at (303), the ith software code block (e.g., software code block (101)) is marked as non-executable. The ith software code block may be marked as non-executable, for example, by the loader (110) of FIG. 1, the loader (110) marking starting and ending locations of the ith software code block as received into the memory (102).

Fourth, at (304), intent to execute the ith software code block is registered with at least one staging register, such as the staging register 104 of FIG. 1. Optionally, and fifth at (305), a verification process is executed. The verification process may be executed, at least in part, by a verification processor such as the verification processor (106) of FIG. 1

Sixth, at (306), the ith software code block is compressed into an ith compression constant by a compression processor, such as the compression processor (107) of FIG. 1. The compression processor (107) may execute a hash algorithm in order to generate the ith compression constant.

Seventh, at (307), the ith compression constant is compared with an ith predetermined value using at least two comparators. The predetermined value may be stored in the memory (102) and compared using the comparators (108a, 108b, . . . , 108n) of FIG. 1.

Eighth, at (308) and responsive to the comparators providing a true result after comparison, the ith software code block is marked as executable to allow the ith software code block to execute. The ith software code block (e.g., software code block (101)) may be marked as executable, for example, by the loader (110).

Ninth, and at (309), the ith software code block executes. The ith software code block (e.g., software code block (101)) may be executed by one or more processors, processing cores, or the like, which may be available to the silicon-based system (100). Optionally, tenth, at (310), the ith software code block is marked as non-executable.

Eleventh, at (311), if a determination is made by a processor, such as the verification processor (106) of FIG. 1, that i=n, the process stops at (312). If, at (311) a determination is made by the verification processor (106) that i≠n, i is incremented by 1 at (313); the ith execution level begins (314); and, optionally, another (e.g., (i+1)th software code block to execute on the silicon-based system is received (402).

Figure 4:
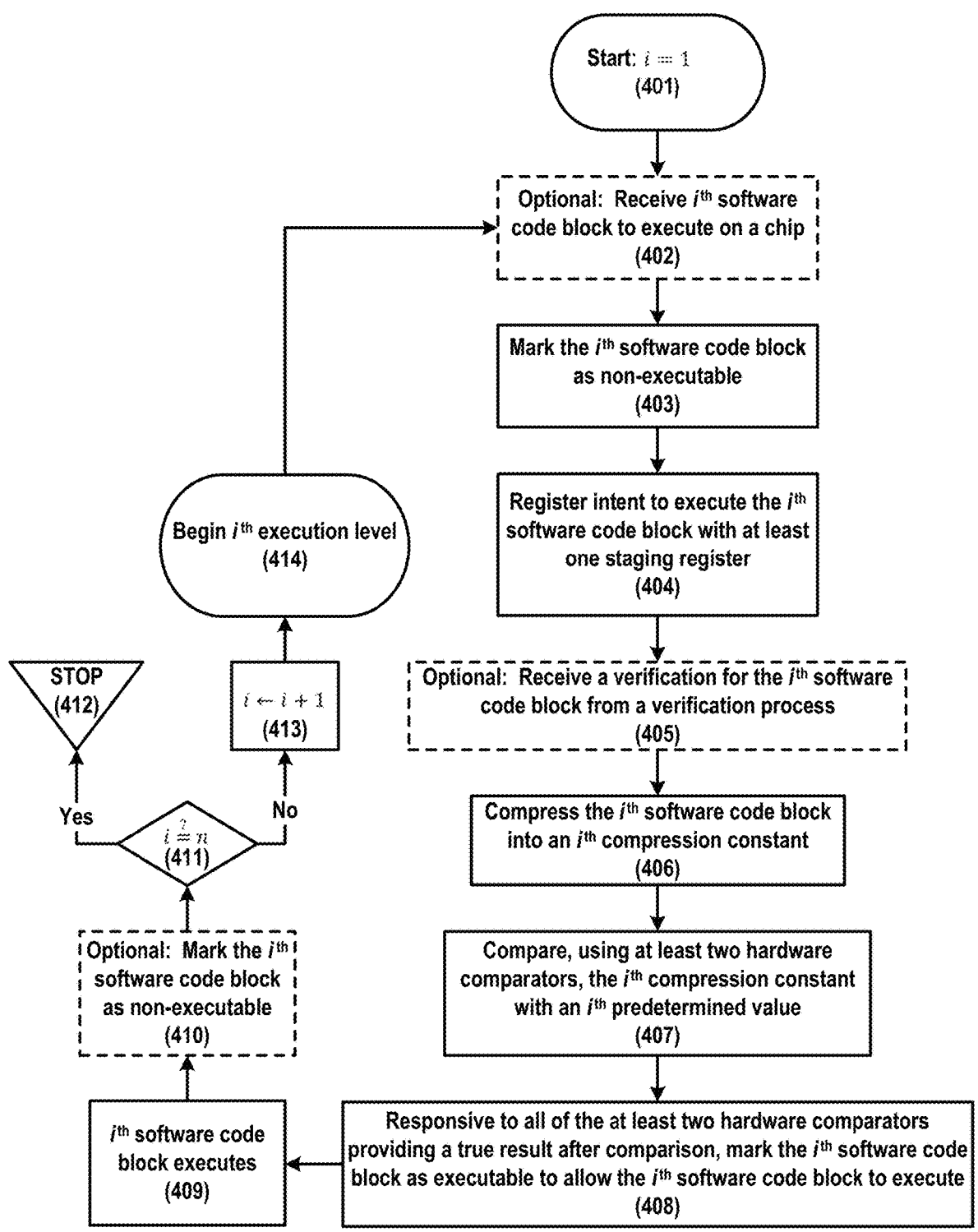
FIG. 4 is a block diagram illustrating an example silicon-based system.

FIG. 4 is a block diagram illustrating an example silicon-based system. The example silicon-based system may use the silicon-based system (100) of FIG. 1.

In a basic configuration (401), the computing device (400) typically includes one or more processors (410) and system memory (420). A memory bus (430) can be used for communicating between the processor (410) and the system memory (420).

Depending on the desired configuration, the processor (410) can be of any type including but not limited to a microprocessor (μP), a microcontroller (μC), a digital signal processor (DSP), or any combination thereof. The processor (410) can include one more levels of caching, such as a level one cache (411) and a level two cache (412), a processor core (413), and registers (414). The processor core (413) can include an arithmetic logic unit (ALU), a floating point unit (FPU), a digital signal processing core (DSP Core), or any combination thereof. A memory controller (415) can also be used with the processor (410), or in some implementations the memory controller (415) can be an internal part of the processor (410).

Depending on the desired configuration, the system memory (420) can be of any type including but not limited to volatile memory (such as RAM), non-volatile memory (such as ROM, EEPROM, flash memory, etc.) or any combination thereof. System memory (420) typically includes an operating system (421), one or more applications (422), and program data (424). The application (422) may include security improvement algorithm (423) for the silicon-based system (100) that creates a glitch-resistant process for executing a software code block, such as the software code block (101) of FIG. 1. The glitch-resistant process may be in accordance with one or more of the flowcharts of FIGS. 2 and 3. Program Data (424) may include storing instructions that, when executed by the one or more processing devices, implement a method for improving security of the silicon-based system (100) by creating a glitch-resistant process.

Additionally, program data (424) may include one or more software code block(s), such as the software code block (101) of FIG. 1, and/or one or more predetermined values for comparison of compression constants. In some embodiments, the application (422) can be arranged to operate with program data (424) on an operating system (421).

The computing device (400) can have additional features or functionality, and additional interfaces to facilitate communications between the basic configuration (401) and any required devices and interfaces.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the computing device (400). The system memory (420) may be the memory (102) of FIG. 1 and subject to methods as described by method 200 of FIG. 2 or method 300 of FIG. 3.

A memory controller (415) may control the system memory (420), or control access to, reading of, or writing to the system memory (420), based on whether a portion of the system memory (420) is marked "executable" or "non-executable". In at least one embodiment, the memory controller (415) may control the system memory (420), or control access to, reading of, or writing to the system memory (420), based on whether a software code block (101) may be executed depending on whether the software code block (101) is marked "executable" or "non-executable".

A processor (410) of the computing device (400) can perform logic and/or comparative functions. The logic and/or comparative functions may be in support of method 200 of FIG. 2 or FIG. 3, and include functions performed by the verification processor (106), the compression processor (107), and the comparators (108a, 108b, . . . , 108n), of FIG. 1. In addition and in particular, the registers (314) of the computing device (400) may perform the functions of the staging register (104) of FIG. 1.

The computing device (400) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (400) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of the present disclosure.

In addition, those skilled in the art will appreciate that the mechanisms of the subject matter described herein are capable of being distributed as a program product in a variety of forms, and that an illustrative embodiment of the subject matter described herein applies regardless of the type of non-transitory computer readable medium used to carry out the distribution. Examples of a non-transitory computer readable medium include, but are not limited to, the following: a recordable type medium such as a flash drive, a hard disk drive, a solid state drive (SSD), a Compact Disc (CD), a Digital Video Disk (DVD), a Blu-ray Disc (BD), a digital tape, a computer memory, an electronically erasable programmable read-only memory (EEPROM), etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Example Aspects

In general, one aspect of the subject matter described in this specification can be embodied in a computer-implemented method for improving security of a silicon-based system by creating a glitch-resistant process for executing a software code block on the silicon-based system, the computer-implemented method comprising: marking the software code block as non-executable; registering intent to execute the software code block with at least one staging register; compressing the software code block into a compression constant; comparing, using at least two comparators, the compression constant with a first predetermined value; and responsive to the at least two comparators providing a true result after comparison, marking the software code block as executable to allow the software code block to execute.

These and other aspects can optionally include one or more of the following features. In at least one aspect, the computer-implemented method further comprises: responsive to at least one of the at least two comparators providing a false result after comparison, forbidding the software code block from executing.

In at least one aspect, the computer-implemented method further comprises: responsive to the marking the software code block as executable, executing the software code block; and after the executing the software code block, marking the software code block as non-executable.

In at least one aspect, the computer-implemented method further comprises: marking a second software code block as non-executable; registering intent to execute the second software code block with at least one staging register; compressing the second software code block into a second compression constant; comparing, using the at least two comparators, the second compression constant with a second predetermined value that is different from the first predetermined value; and responsive to the at least two comparators providing a true result after the comparing, marking the second software code block as executable to allow the second software code block to execute. Such a computer-implemented method may further comprise receiving the software code block to execute on the silicon-based system as well as receiving a verification for the second software code block from a verification process.

In at least one aspect, the computer-implemented method further comprises: responsive to an attempt to read the software code block when the software code block is marked as non-executable, providing an error or locking down the silicon-based system so that the software code block does not execute.

In at least one aspect of the computer-implemented method, the marking the software code block as non-executable includes storing the software code block in memory already marked as non-executable.

In at least one aspect of the computer-implemented method, a loader marks memory that may contain the software code block as non-executable before storing the software code block.

In at least one aspect, the computer-implemented method further comprises: responsive to at least one of the at least two comparators providing a false result after comparison, marking the software code block as untrusted; and providing an error or locking down the silicon-based system so that further code execution is forbidden.

In general, one aspect of the subject matter described in this specification can be embodied in an apparatus providing a glitch-resistant process for executing a software code block, the apparatus comprising: a staging register; two comparators; and a processor, wherein the processor is configured to perform operations including: marking the software code block as non-executable; registering intent to execute the software code block with the staging register; compressing the software code block into a compression constant; comparing, using the two comparators, the compression constant with a first predetermined value; and responsive to the two comparators providing a true result after comparison, marking the software code block as executable to allow the software code block to execute.

In at least one aspect, the apparatus is configured to receive a verification for the software code block from a verification processor.

In at least one aspect, the apparatus is further configured to hash the software code block and metadata relating to the software code block.

In at least one aspect, the apparatus is configured to perform further operations including: responsive to the two comparators providing a false result after comparison, forbidding the software code block from executing.

In at least one aspect, the apparatus is configured to perform further operations including: responsive to the marking the software code block as executable, executing the software code block; and after the executing the software code block, marking the software code block as non-executable.

In at least one aspect, the apparatus further comprises: memory; and a loader, wherein the loader is configured to mark memory that will contain the software code block as non-executable before storing the software code block in the memory marked as non-executable.

In at least one aspect, the processor of the apparatus is further configured to perform further operations including: marking a second software code block as non-executable; registering intent to execute the second software code block with the at least one staging register; compressing the second software code block into a second compression constant; comparing, using the two comparators, the second compression constant with a second predetermined value that is different from the first predetermined value; and responsive to the two comparators providing a true result after the comparing, marking the second software code block as executable to allow the second software code block to execute.

In at least one aspect, the processor of the apparatus is further configured to perform further operations including:

responsive to the two comparators providing a false result after comparison, marking the software code block as untrusted; and providing an error or locking down the apparatus so that further code execution is forbidden.

What is claimed is:

1. A computer-implemented method, the method comprising:
   marking a software code block stored in a memory of a silicon-based system as non-executable, the marking including identifying a starting memory address and an ending memory address associated with the software code block stored in the memory that is marked as non-executable;
   registering, with a staging register of the silicon-based system, an intent to execute the software code block;
   verifying, with a verification processor of the silicon-based system, that the software code block is executable by comparing a hash of the software code block and metadata of the software code block with a bitfield representation of the software code block and metadata of the software code block;
   generating, with a compression processor of the silicon-based system and as part of a validation process to determine that the software code block is not malicious, a compression constant for the software code block via a hash algorithm;
   providing, from the compression processor, the hash of the software code block to a first comparator and a second comparator of the silicon-based system;
   comparing, with the first comparator, the compression constant with a predetermined value to provide a first comparison result of the compression constant useful to validate the software code block;
   comparing, with the second comparator, the compression constant with the predetermined value to provide a second comparison result of the compression constant useful to validate the software code block;
   validating that the software code block is not malicious based on the first comparison result of the compression constant provided by the first comparator and the second comparison result of the compression constant provided by the second comparator; and
      in response to verifying that the software code block is executable and validating that the software code block is not malicious, marking the software code block as executable to allow execution of the software code block; or
      in response to failing to verify that the software code block is executable or failing to validate that the software code block is not malicious, preventing execution of the software code block.

2. The computer-implemented method of claim 1, wherein preventing the execution of the software code block comprises:
   marking the software code block as untrusted; and
   providing an error indication to prevent further execution of code.

3. The computer-implemented method of claim 1, further comprising:
   responsive to marking the software code block as executable, executing the software code block; and
   after executing the software code block, marking the software code block as non-executable.

4. The computer-implemented method of claim 1, further comprising, responsive to determining an attempt to read the software code block when the software code block is marked as non-executable, providing an error indication to prevent execution of the software code block.

5. The computer-implemented method of claim 1, wherein the marking of the software code block as non-executable includes storing the software code block in a memory of the silicon-based system that is marked as non-executable.

6. The computer-implemented method of claim 1, wherein the software code block comprises code to be executed responsive to a jump instruction.

7. The computer-implemented method of claim 1, further comprising:
   receiving, at the staging register of the silicon-based system, a request to execute the software code block stored in the memory, and wherein:
   registering the intent to execute the software code block is in response to receiving the request to execute the software code block.

8. The computer-implemented method of claim 1, wherein the compression processor of the silicon-based system implements a secure hash algorithm-2 (SHA2) or secure hash algorithm-3 (SHA3) to generate the hash of the software code block that is provided to the first comparator and the second comparator.

9. The computer-implemented method of claim 1, further comprising:
   receiving the software code block and metadata of the software code block; and
   storing the software code block to the memory of the silicon-based system.

10. The computer-implemented method of claim 1, further comprising locking the software code block to prevent execution of the software code block until the intent is registered with the staging register.

11. The computer-implemented method of claim 1, wherein marking the software code block as executable comprises marking the memory storing the software code block as executable.

12. An apparatus comprising:
   one or more processors;
   a memory configured to store software code; and
   a controller associated with the memory and configured to:
      mark a software code block stored in the memory as non-executable, the mark including identification of a starting memory address and an ending memory address associated with the software code block that is marked as non-executable;
      register, with a staging register of the apparatus, an intent to execute the software code block;
      verify, with a verification processor of the apparatus, that the software code block is executable based on a comparison of a hash of the software code block and metadata of the software code block with a bitfield representation of the software code block and the metadata of the software code block;
      generate, with a compression processor of the apparatus and as part of a validation process to determine that the software code block is not malicious, a compression constant for the software code block via a hash algorithm;
      provide, from the compression processor, the hash of the software code block to a first comparator and a second comparator of the apparatus;
      compare, with the first comparator, the compression constant with a predetermined value to provide a first comparison result of the compression constant useful to validate the software code block;
compare, with the second comparator, the compression constant with the predetermined value to provide a second comparison result of the compression constant useful to validate the software code block;
validate that the software code block is not malicious based on the first comparison result of the compression constant provided by the first comparator and the second comparison result of the compression constant provided by the second comparator; and
in response to verification that the software code block is executable and validation that the software code block is not malicious, mark the software code block as executable to allow the apparatus to execute the software code block; or
in response to a failure to verify that the software code block is executable or a failure to validate that the software code block is not malicious, prevent execution of the software code block.

13. The apparatus of claim 12, wherein to prevent the execution of the software code block comprises to:
mark the software code block as untrusted; and
provide an error indication or to lock down the apparatus to prevent further execution of code by the apparatus.

14. The apparatus of claim 12, wherein the controller is further configured to:
responsive to the software code block being marked as executable, execute the software code block; and
after execution of the software code block, mark the software code block as non-executable.

15. The apparatus of claim 12, wherein the controller is further configured to, responsive to an attempt to read the software code block when the software code block is marked as non-executable, provide an error indication or lock down the apparatus to prevent execution of the software code block.

16. The apparatus of claim 12, wherein to mark the software code block as non-executable includes to store the software code block in a memory of the apparatus that is marked as non-executable.

17. The apparatus of claim 12, wherein the controller is further configured to:
receive, at the staging register of the apparatus, a request from the one or more processors to execute the software code block stored in the memory, and wherein:
to register the intent to execute the software code block with the staging register is responsive to reception of the request to execute the software code block.

18. The apparatus of claim 12, wherein the controller is further configured to:
receive the software code block as a payload to store to the memory, the payload comprising the software code block and metadata of the software code block; and
store the software code block of the payload to the memory.

19. The apparatus of claim 12, wherein the compression processor of the apparatus implements a secure hash algorithm-2 (SHA2) or secure hash algorithm-3 (SHA3) to generate the hash of the software code block that is provided to the first comparator and the second comparator.

20. The apparatus of claim 12, wherein the software code block comprises code to be executed responsive to a jump instruction or as part of a conditional operation.

* * * * *